United States Patent [19]

Sawhill

[11] Patent Number: 5,185,174

[45] Date of Patent: * Feb. 9, 1993

[54] METHOD OF MAKING NON-HYGROSCOPIC SUGAR AND PROTEIN SOLIDS

[75] Inventor: J. W. Sawhill, Canoga Park, Calif.

[73] Assignee: Pacific Kenyon Corporation, Long Beach, Calif.

[*] Notice: The portion of the term of this patent subsequent to Jan. 24, 2006 has been disclaimed.

[21] Appl. No.: 680,914

[22] Filed: Apr. 5, 1991

Related U.S. Application Data

[63] Continuation-in-part of Ser. No. 428,971, Oct. 30, 1989, abandoned.

[51] Int. Cl.⁵ .............................................. A23K 1/00
[52] U.S. Cl. ..................................... 426/583; 426/465; 426/623; 426/626; 426/630; 426/635; 426/807
[58] Field of Search ............... 426/583, 630, 635, 623, 426/626, 465, 805

[56] References Cited

U.S. PATENT DOCUMENTS

| | | | |
|---|---|---|---|
| 3,278,309 | 10/1966 | Heap et al. | 99/6 |
| 3,813,297 | 5/1974 | Shaw . | |
| 3,821,446 | 6/1974 | Estey et al. | 426/373 |
| 4,027,043 | 4/1986 | Schroeder et al. | 426/512 |
| 4,800,088 | 1/1989 | Sawhill | 426/69 |

Primary Examiner—Jeanette Hunter
Assistant Examiner—Helen Pratt
Attorney, Agent, or Firm—Plante, Strauss & Vanderburgh

[57] ABSTRACT

A method of producing non-hygroscopic solids from aqueous food solutions of sugars and proteins by mixing an aqueous solution which contains at least 45 weight percent solids comprising at least 20 percent of protein or sugar or mixtures thereof with additives comprising calcium oxide or hydroxide and a soluble phosphate. The resultant mixture is then dried by evaporation to reduce its moisture content to less than twelve weight percent. Depending on the intended use of the product, the mixture can be formed or shaped into the desired form and then dried, or the mixture can be dried and comminuted to produce a free-flowing granular product.

28 Claims, No Drawings

METHOD OF MAKING NON-HYGROSCOPIC SUGAR AND PROTEIN SOLIDS

This application is a continuation-in-part of my copending application, Ser. No. 07/428,971, filed on Oct. 30, 1989, now abandoned.

BACKGROUND OF THE INVENTION

1. Field of Invention

This invention relates to a method for treating aqueous solutions of sugars and proteins to obtain non-hygroscopic solids. In one aspect, the invention relates to a dry pet food, useful as a dog treat, and to solid animal feed supplements.

2. Brief Statement of Prior Art

Aqueous solutions of sugars and/or proteins are commonly produced as by-products of the food industry. Typical of these are cane molasses and beet molasses which are produced as by-products of the sugar industry. Citrus molasses is a by-product of fruit juice concentrate manufacture. Wood molasses is a by-product of the pulp and paper industry. Corn syrup and corn steep liquor, which is high in protein, are produced during processing of corn. Whey is a by-product of cheese manufacture. The aforementioned solutions are usually concentrated for more efficient and economical handling.

The degree of concentration, i.e., solids content, which is commonly achieved is variable and depends on the particular solution. Thus, cane and beet molasses and corn syrup are commonly produced and handled at 75 to 80 percent solids while citrus and wood molasses contain about 50 percent solids. Whey, condensed molasses solubles and corn steep liquor are also usually concentrated to about 50 percent solids.

The shipping and storage of these solutions thus entails shipping and handling a considerable weight and volume of water. Additionally, the water activity of these solutions is usually sufficiently high to permit microbial growth, and precautions in handling, and addition of preservatives, are necessary to prevent spoilage.

The difficulties and expenses encountered in handling and storing of these concentrated aqueous solutions has prompted efforts to dry the liquids to solids. Cane molasses and whey have been dried, however, the processes are complex and costly, often requiring two or more steps and concluding with spray drying. Additionally, the solids which are obtained are quite hygroscopic and precautions must be taken to keep the solids dry, or in sealed containers. These disadvantages have confined dried molasses and whey solids to very limited, specialized markets.

The aforementioned solutions of sugars and/or proteins are frequently used in animal feeds. The costs incurred to dry these solutions and the handling and storing precautions for the dried solids have, heretofore, precluded use of the dried solids for animal feeds. Instead, the concentrated solutions are used directly in liquid blends with other feed ingredients such as protein meals, fats, minerals and vitamins. Molasses has been dried on a solid carrier such as soybean hulls or pressed oil cake to prepare a dry animal feed supplement. Since the solid carrier is used in amounts up to equal weights with the molasses, no concentration of the molasses is achieved; instead, a solid carrier is substituted for water. This product has a limited market which is confined to farms and ranches which lack equipment to handle molasses.

In the past decade, these solutions have also been gelled into animal feed blocks by the addition of calcium oxide, or hydroxide, and a soluble phosphate in the manner described in U.S. Pat. No. 4,027,043. Since the gelling additives and other feed ingredients are added batchwise and the resulting mixture is poured into boxes or molds, the products have become known as poured molasses blocks. These blocks have found widespread use for range cattle feeding as sources of energy, minerals and vitamins. Other applications have included supplement feeding of horses, sheep and dairy cattle. The blocks have been produced and marketed in various sizes from 40 pounds to one ton, and the most popular size currently being 250 pounds. The water contents of the gelled solids are from 25 to about 35 weight percent, although some experimental poured blocks have been obtained with only 22 weight percent water and as high as 40 weight percent water. The substantial water content of these blocks has generated problems. It is usually necessary to add preservatives and to exercise precautions in handling and storing of the blocks to avoid spoilage. The blocks are also cumbersome and bulky, and are not as easily handled as are bulk quantities of granular solids.

In a related process, molasses is concentrated by evaporation under a vacuum to a very low water content, and dry animal feed solids such as protein meals, vitamins and minerals are added before the concentrated molasses solidifies. In commercial practice, the solid product is quite hygroscopic and must be stored and handled in metal or plastic barrels.

In my prior U.S. Pat. No. 4,643,908, I disclose that a soft and moist dog food can be prepared from approximately equal parts water, inverted whey and a meat meal. These ingredients are gelled to obtain a solid which is highly palatable and nutritious. The product, however, is tacky and has a crumbly texture, and is thus difficult to store and handle.

BRIEF DESCRIPTION OF THE INVENTION

The invention comprises a method of producing non-hygroscopic solids from aqueous food solutions of sugars and proteins and to the non-hygroscopic solids. The method comprises mixing an aqueous solution which contains at least 45 weight percent solids comprising at least 20 percent of protein or sugar or mixtures thereof with an alkaline earth metal oxide or hydroxide and a strong acid, preferably phosphoric acid. The alkaline earth oxide or hydroxide is used at a concentration from 0.2 to about 2 weight percent, calculated as the oxide, and the acid is added to adjust the pH to neutrality, and preferably to acidic values, i.e., within a pH range from 3.5 to 7.5, preferably 3.5 to 6.5. The resultant mixture is then dried by evaporation to reduce its moisture content to less than twelve weight percent. Depending on the intended use of the product, the mixture can be formed into a final shape and then dried, or it can be dried and comminuted to produce a free-flowing granular or powdered product.

DESCRIPTION OF PREFERRED EMBODIMENTS

Aqueous food solutions which can be treated by the method of this invention are most sugar and protein solutions which are used for animal feeds. The most common solutions are concentrated sugar solutions such as cane molasses, beet molasses, citrus molasses, wood molasses, whey and corn syrup. Other solutions include concentrated protein solutions such as corn steep liquor and condensed molasses solubles.

Other edible products include specialty products such as blackstrap molasses, malted barley extract, corn syrup, delactosed whey, inverted whey and whey permeates formed in protein fractionation of whey, etc. Specialty products can also be produced, such as dried honey, dried raisin, dried maple syrup, dried powdered yogurt, dried cultured buttermilk, dried mild extract, dried malted milk, etc. All of these products contain sugars or proteins in a concentrated form, and most or all resist further concentration and form hygroscopic solids.

The preferred molasses source is commercially available with a sugar content from about 65 to 85 Brix and a consistency that varies from a thin to a thick syrup. The water content of these solutions is from 5 to about 30 weight percent. The molasses can be any sugar containing molasses such as cane or Blackstrap Molasses, beet molasses, converted molasses wood sugar molasses, hydrosyrup, citrus molasses and the like.

Another sugar solution that can be used is whey, a by-product of the dairy industry. The whey is a dilute solution of lactalbumin, lactose, some fats, and the soluble inorganics from the parent milk. This whey solution can be spray dried to a powder, but is usually condensed to about 40 to 60 percent solids and preserved. A typical analysis is as follows:

TABLE 1

| Composition of a Typical Dried Whey | |
|---|---|
| Protein | 12.0% |
| Fat | 0.7% |
| Lactose | 60.0% |
| Phosphorous | 0.79% |
| Calcium | 0.87% |
| Ash | 9.7% |

A third source of a useful sugar solution is the pulp and paper industry which produces large quantities of by-product lignin sulfonates from wood during the sulfite pulping process. After the separation of lignin, the acidity of the resultant solution is neutralized with an ammonium or alkali metal bisulfite compound or base to form the following organic salts:

Ammonium lignin sulfonate;
lignin sulfonate; and
Magnesium lignin sulfonate.

A typical analysis of a commercially available ammonium lignin sulfonate solution is as follows:

TABLE 2

| Typical Analysis of Ammonium Lignin Sulfonate | |
|---|---|
| Percent Solids | 50% |
| Specific gravity | 1.237 |
| pH 10% solution | 3.5 |
| Sugars - expressed as glucose | 16.0% |
| Tannin content | 45.0% |
| Available ammonia | 3.0% |
| Sulfur | 6.0% |
| Ash | 1.0% |

The sugar solution is an energy source useful in foods, particularly animal feed supplements. Sources of other metabolizable organic values can be used to replace a portion of the sugar solutions. Examples of such other useful energy ingredients sources include condensed and dehydrated molasses solubles which are obtained from the fermentation of molasses to produce chemicals such as ethanol, citric acid, glutamic acid, etc. A material rich in metabolizable values, known as condensed molasses solubles, is obtained by evaporation of the residue from this fermentation. This material can also be dehydrated to dryness and the resultant dry solid is also a useful additive.

Another very useful feed solution is condensed or concentrated fermented corn extract, which is sometimes referred to as corn steep liquor or mazoferm. This material is obtained by concentrating the liquid remaining after steeping corn in an aqueous sulfur dioxide solution and allowing it to ferment.

These materials can have from 40 to 90 percent solids (the balance being water) and can contain, on a dry weight basis, from 1 to 15 percent sugar and contain significant contents of Protein, e.g., from 5 to about 25 percent. All, or any portion, of the aforementioned sugar solutions can be replaced with these feed solutions, depending on the amount of natural protein which is desired in the final supplement.

The Acidic and Alkaline Additives

In the method, a soluble strong acid, e.g., sulfuric, hydrochloric, phosphoric, or acetic acid, and an alkaline material such as an alkaline earth metal oxide or hydroxide are added to the feed solution. Phosphoric acid is preferred and appears to be most effective with all liquids investigated. Also, phosphoric acid increases the phosphorus food value of the product. In some, applications, however, sulfuric acid or hydrochloric acid provide operating advantages. As an example, the use of hydrochloric acid imparts a much lower viscosity to the liquid undergoing concentration, thereby improving the internal mixing of the liquid during the evaporation step.

The aforementioned acids provide control over the pH of the liquid, so that degradation of the product is minimized. Any suitable source of the acids can be used, e.g., commercially available grades, from 50 to 98 weight percent phosphoric acid, from 25 to 85 weight percent sulfuric acid, etc.

The strong acid or salt thereof is employed in the solution at a concentration from about 0.05 to about 2.0, preferably from 0.1 to about 1.0 weight percent, expressed as $P_2O_5$, $SO_3$, $Cl$, or $C_2H_3OOH$.

Alkaline earth oxides or hydroxides which can be used are magnesium or calcium oxides or hydroxides. Of the aforementioned, calcium oxide or hydroxide are preferred. Commercially available lime, calcium oxide, is useful in finely subdivided form, typically 90 weight percent or more passing a 125 mesh screen. The more finely subdivided the lime, the faster that it will hydrate and participate and dissolve in the solution. The lime can be slaked by mixing with water prior to addition to the sugar solution, or if desired, can be added directly to the aqueous solution, depending on the process equipment and controls.

The amount of the alkaline earth oxide or hydroxide additive which is employed can be from 0.1 to about 3.0 weight percent, expressed as the oxide, and preferably is from about 0.3 to about 2.0 weight percent, based on the weight of the solution.

The Method

In the preferred method, the alkaline earth oxide or hydroxide is mixed with water to prepare a suspension which contains approximately 20 to 40 weight percent calcium or magnesium, calculated as the oxide. This mixing will require slow speed stirring for 5 to 15 minutes. When lime is used, a substantial exotherm occurs and the temperature of the mixture may rise to 175° F. to 210° F. The feed solution is then added and the mixture is stirred to mix the additive thoroughly in the feed solution. This mixing can be slow speed stirring for 5 to 15 minutes.

The acidic additive is added to the mixture of feed solution and alkaline additive and the mixture is stirred for sufficient time to obtain complete mixing, typically about 5 minutes. The temperature of the mixture will increase as the reaction between the additives occurs.

The aforementioned additives are added in proportions sufficient to provide a pH value in the solution which is from 3.5 to about 7.5, preferably from 3.5 to about 6.5. It has been found that the optimum properties in the final dried product, such as sweetness and taste and non-hygroscopicity, are obtained at the preceding pH values. The particular order of mixing of the aforementioned additives and the liquid to be dried is not important, and any other sequence or order can be used, e.g., both additives can be added simultaneously to the liquid immediately prior to or during its concentration.

The liquid can be discharged directly to the drying step, and this is desirable as it reduces handling and the exothermic heat released in the previous steps serves to preheat the product for the drying step. Various drying steps can be used. One suitable drying procedure is to pour the liquid onto a travelling belt which can carry pans or trays through a drum or tunnel drier where the solid is contacted with dry air at temperatures from 100° to 300° F. In this drying step the solid can be maintained at the selected temperature which is preferably from 125° F. to 250° F. by radiant heating or by convection heating with dry air. In the latter application, the dry air can be preheated to a temperature of 275° F. to 350° F. and then introduced into contact with the solid gel.

The resulting dried solid is discharged from the belt as it exits the drum or tunnel as solid, dry flakes. Alternative drying procedures can be: (1) spray drying wherein the liquid mixture is discharged as a spray of liquid droplets which fall through a countercurrent flow of dry air at the aforementioned temperatures, which are sufficient to heat the solid to a temperature from 100° to 300° F.; or (2) drum drying wherein a drum which is heated, usually by a steam jacket, is rotated while partially immersed in the liquid. As the drum rotates, it collects a film of liquid on its surface, which is dried as it is lifted out of the bath. A scrapper removes the dried solid from the drum surface before it rotates back into the liquid bath.

The Filler

When the non-hygroscopic solid is to be used as an animal feed, it can be distributed onto a solid carrier prior to drying. In this application, the solid carrier can be used in an amount from 5 to 50 weight percent of the final, dried solid. Preferably, it is used in an amount from 10 to 35 weight percent. The solid carrier can be any suitable animal feed or roughage such as a protein meal, e.g., cottonseed meal, soy meal, rape seed meal, sunflower seed meal, alfalfa pellets, dried alfalfa, dried and sterilized poultry manure, fish meal, corn gluten meal, feather meal, etc. Other suitable carriers arc brans, hulls, shells or screenings of grains, seeds or nuts.

These carriers are abundant and include: oat hulls, barley hulls, wheat hulls, almond hulls, almond shells, walnut shells, rye mill run, rye middlings, peanut skins, peanut hulls, rice hulls, rice bran, oat screenings, barley screenings, wheat screenings, wheat middlings, wheat shorts, etc. Screenings are the foreign material produced during cleaning of grain and seeds, and include light and broken grains and agricultural seeds, weed seeds, hulls, chaff, joints, straw, mill dust, sand and dirt. The two designations of screenings which can be used are: grain screenings and mixed screenings. The grain screenings have at least 70 percent light and broken grains, wild buckwheat and wild oats. Mixed screenings contains less than 70 percent of grains. The fillers have food value, and the following table summarizes the compositions of various available fillers, as well as meals which can be used with the filler:

TABLE 3

| Filler | Crude Protein | Crude Fat | Crude Fiber |
| --- | --- | --- | --- |
| Almond Hulls | 4.4 | 4.0 | 14.0 |
| Barley Bran | 12.5 | 4.3 | 21.3 |
| Barley Middlings | 16.3 | 5.0 | 10.4 |
| Barley Mill Run | 11.7 | 2.8 | 15.7 |
| Bean Hulls, Velvet | 13.4 | 2.2 | 28.2 |
| Corn Gluten Meal | 48.0 | 2.4 | 4.2 |
| Corn, Broom | 10.6 | 4.8 | 5.8 |
| Cottonseed Hulls | 4.3 | 1.0 | 50.0 |
| Cottonseed Meal | 44.8 | 2.3 | 13.0 |
| Cottonseed, Whole | 24.9 | 21.1 | 18.0 |
| Feather Meal | 87.4 | 2.9 | 0.6 |
| Flax Hulls | 8.5 | 1.5 | 31.5 |
| Flax Seed Screenings | 17.3 | 10.9 | 14.2 |
| Grape Pomace, Dried | 12.7 | 7.6 | 33.0 |
| Hops, Spent, Dried | 24.8 | 5.1 | 24.3 |
| Oat Hulls | 3.8 | 1.5 | 32.2 |
| Oat Middlings | 17.4 | 6.4 | 3.2 |
| Oat Mill By-Product | 6.1 | 2.1 | 29.4 |
| Oat Mill Feed | 3.1 | 1.1 | 35.1 |
| Oat Shorts | 14.1 | 6.1 | 14.8 |
| Peanut Skins | 17.4 | 2.5 | 12.6 |
| Rice Bran | 13.0 | 13.0 | 13.0 |
| Rice By-Product | 6.7 | 5.6 | 33.0 |
| Rice Hulls | 3.1 | 0.9 | 44.5 |
| Rice Middlings | 15.6 | 6.8 | 9.6 |
| Rye Middlings | 18.4 | 3.8 | 5.8 |
| Rye Mill Run | 18.5 | 3.7 | 5.1 |
| Safflower Seeds | 19.5 | 32.0 | 31.0 |
| Screenings | 14.2 | 5.2 | 13.1 |
| Soybean Hulls | 12.4 | 2.8 | 36.1 |
| Soybean Meal | 49.6 | 1.4 | 7.0 |
| Soybean Mill Run | 13.6 | 1.4 | 40.7 |
| Wheat Bran | 18.0 | 5.0 | 11.0 |
| Wheat Chaff | 5.5 | 1.7 | 32.2 |
| Wheat Middlings | 19.9 | 5.7 | 8.9 |
| Wheat Mill Run | 17.0 | 4.8 | 9.0 |
| Wheat Shorts | 18.1 | 5.5 | 7.3 |
| Wheat Screenings | 13.6 | 4.3 | 10.2 |
| Buckwheat Hulls | 5.0 | 1.0 | 44.0 |
| Peanut Hulls | 6.0 | 1.0 | 60.0 |

The method is illustrated by the following examples which also serve to illustrate the results obtainable by the invention:

EXAMPLE 1

The rate of evaporation of water from cane molasses was studied in laboratory experiments in which samples of the molasses containing varied amounts of lime and phosphoric acid were subjected to standard drying conditions. The cane molasses studied was from a large sample of commercial grade, 79.5 Brix concentration, molasses. In each experiment, the proportions of lime and phosphoric acid were varied to provide changes in quantities of lime and final pH values of the molasses samples.

The standard drying conditions were as follows: a portion of 5 to 6 grams of each prepared sample was poured into an aluminum foil cup, 50 millimeters in diameter, to provide a liquid depth of approximately 3 millimeters. The samples were weighed and placed in a forced air oven maintained at 190 degrees F. and inspected and weighed after 0.5, 1.5, 2.5 and 3.5 hours.

The following table summarizes the formulas and pH values investigated:

TABLE 4

| Ingredients | #1 | #2 | #3 | #4 |
|---|---|---|---|---|
| 1) 20% Quick Lime | 10 | 20 | 30 | 40 |
| 2) Cane Molasses | 200 | 200 | 200 | 200 |
| 3) Phos Acid | yes | yes | yes | yes |
| A) pH 1 | 8.4 | 10.0 | 10.0 | 10.0 |
| B) pH 2 | 7.4 | 7.3 | 7.2 | 7.4 |
| C) pH 3 | 5.0 | 4.8 | 4.7 | 4.8 |

The results expressed in percentages of water removed from the sample (loss in weight relative to water initially present) are summarized in the following table:

TABLE 5

| | | | Drying Rates for Samples | | | | | |
| | % | | Drying Time (Hours) | | | | | Minutes |
| SN | Lime | pH | 0.5 | 1.0 | 1.5 | 2.5 | 3.0 | 3.5 | to Dry |
|---|---|---|---|---|---|---|---|---|---|
| 1A | 1% | alk | 42 | 53 | 68 | 79 | 83 | 83 | — |
| 1B | 1% | neut | 41 | 59 | 68 | 86 | 91 | 95 | — |
| 1C | 1% | acid | 53 | 74 | 84 | 105 | — | — | 150 |
| 2A | 2% | alk | 53 | 70 | 74 | 87 | 87 | 92 | 180 |
| 2B | 2% | neut | 50 | 68 | 82 | 104 | — | — | 150 |
| 2C | 2% | acid | 62 | 95 | 105 | — | — | — | 120 |
| 3A | 3% | alk | 57 | 71 | 76 | 86 | 91 | 95 | — |
| 3B | 3% | neut | 50 | 72 | 92 | 104 | — | — | 150 |
| 3C | 3% | acid | 74 | 100 | 104 | — | — | — | 90 |
| 4A | 4% | alk | 50 | 66 | 75 | 88 | 92 | 95 | — |
| 4B | 4% | neut | 46 | 68 | 82 | 110 | — | — | 150 |
| 4C | 4% | acid | 82 | 105 | — | — | — | — | 60 |
| Control | | 5.2 | 39 | 50 | 56 | 72 | 78 | 84 | — |

The results indicate that the samples with the acidic pH values (4.7–5.0) dried at the fastest rate, and that the drying rate decreased as the pH of the samples increased. When the lime content was increased above 2 percent, the drying rate of the acidic pH samples was markedly increased. A lime content above 2 % also achieved the fastest drying rate for the neutral and alkaline pH samples. The control sample remained a liquid and only 84% of its water content was removed after three hours of drying.

EXAMPLE 2

The rate of evaporation of water from beet molasses was studied in laboratory experiments similar to those of Example 2, in which a sample of commercial grade beet molasses was substituted for the cane molasses used in Example 1.

As in Example 1, the proportions of lime and acid were varied to provide changes in quantities of lime and final pH values of the beet molasses samples, and the samples were subjected to the same, standard drying conditions.

The following table summarizes the formulas and pH values investigated:

TABLE 6

| Ingredients, Etc. | 1st Series | 2nd Series | 3rd. Series |
|---|---|---|---|
| 1) 20% Quick Lime | 20 gm | 40 gm | 40 gm |

TABLE 6-continued

| Ingredients, Etc. | 1st Series | 2nd Series | 3rd. Series |
|---|---|---|---|
| 2) Beet Molasses | 200 gm | 200 gm | 200 gm |
| 3) Phos Acid | X | X | — |
| 4) Sulfuric Acid | — | — | X |
| A) pH 1 | 10.0 | 10.0 | 10.0 |
| B) pH 2 | 7.0 | 7.8 | 5.1 |
| C) pH 3 | 4.5 | 4.5 | 4.0 |
| Moisture | 32% | 36% | 36% |
| Lime | 2% | 4% | 4% |

The drying rate of the samples were determined by the measured weight losses of the samples at the aforementioned periods in the drying oven. The following results, expressed in percentage of water removed, were obtained:

TABLE 7

| No. | % Lime | pH | Acid | 0.5 Hr | 1.5 Hr | 2.5 Hr | 3.5 Hr |
|---|---|---|---|---|---|---|---|
| 1 | none | | | 25 | 31 | 44 | 44 |
| 1A | 2% | 10.0 | — | 33 | 59 | 59 | 65 |
| 1B | 2% | 7.0 | phos | 33 | 50 | 67 | 67 |
| 1C | 2% | 4.5 | phos | 53 | 76 | 82 | 95 |
| 1 | none | | — | 25 | 31 | 44 | 44 |
| 2A | 4% | 10.0 | — | 43 | 55 | 70 | 70 |
| 2B | 4% | 7.8 | phos | 53 | 74 | 84 | 89 |
| 2C | 4% | 4.5 | phos | 78 | 100 | 95 | 100 |
| 1 | none | | — | 25 | 31 | 44 | 44 |
| 3A | 4% | 10.0 | — | 43 | 55 | 70 | 80 |
| 3B | 4% | 5.1 | sulf | 47 | 68 | 74 | 84 |
| 3C | 4% | 4.0 | sulf | 47 | 63 | 68 | 81 |

The results indicate that the addition of lime, alone, increases the drying rate of beet molasses, and that the drying rates progressively increased as the pH of the samples was lowered. The samples containing 4% lime had a higher drying rate than the samples containing only 2% lime. Sulfuric acid improved the drying rate, however, it was not quite as effective as phosphoric acid. The sweetness decreased, and the samples became discolored at the high pH values (10.0). The maximum sweetness of the samples was observed at pH values below 7.0.

EXAMPLE 3

The experiment was repeated with citrus molasses using lime and phosphoric acid. The following table summarizes the formulations of the samples subjected to the standard drying conditions:

TABLE 8

| | Formulations | | |
| SN | Description | Series #1 | Series #2 |
|---|---|---|---|
| 1 | 20% Quick Lime Solution | 20 | 40 |
| 2 | Citrus Molasses | 200 | 200 |
| 3 | Phos Acid | X | X |
| 4 | Sulfuric Acid | — | — |
| | A pH 1 | 10.0 | 10.0 |
| | B pH 2 | 5.5 | 5.8 |
| | C pH 3 | 4.2 | 4.4 |

The drying rates, expressed in percentage of water removed, are set out in the following table:

TABLE 9

| SN | pH | 1 Hr | 1.5 Hr | 2 Hr | 2.5 Hr | Time to Dry (Minutes) |
|---|---|---|---|---|---|---|
| | Drying Rates for 2% Lime & Phos Acid | | | | | |
| 1 | as is | 78 | 85 | 92 | 100 | 150 |
| 1A | 10.0 | 80 | 85 | 89 | 93 | 150 |
| 1B | 5.5 | 85 | 91 | 93 | 96 | 120 |
| 1C | 4.2 | 75 | 95 | 100 | 100 | 90 |

TABLE 9-continued

| SN | pH | 1 Hr | 1.5 Hr | 2 Hr | 2.5 Hr | Time to Dry (Minutes) |
|---|---|---|---|---|---|---|
| Drying Rates for 4% Lime & Phos Acid ||||||
| 2 | — | 78 | 85 | 92 | 100 | 150 |
| 2A | 10.0 | 73 | 83 | 90 | 96 | 150 |
| 2B | 5.8 | 90 | 95 | 97 | 100 | 90 |
| 2C | 4.4 | 82 | 95 | 95 | 97 | 90 |

The drying rates which were obtained indicate that citrus molasses responded to the addition of lime and phosphoric acid similarly as cane and beet molasses, however, the drying rates were less.

EXAMPLE 4

A series of experiments was run to evaluate the use of various acids to adjust the pH of the liquid prior to evaporation of water. The experiments determined the effect of the following acids:
a) Phosphoric Acid
b) Sulfuric Acid
c) Acetic Acid
d) Hydrochloric Acid
e) Propionic Acid The acids were added in separate experiments in sufficient quantities to obtain liquids at neutral pH (6-8) and acidic pH (4-5) values.

The following formulations were prepared and tested with two control samples which were untreated cane molasses, and cane molasses with 2% quick lime.

TABLE 10

| Ingredient | #1 | #2 | #3 | #4 | #5 |
|---|---|---|---|---|---|
| Quick Lime 20% | 10 | 10 | 10 | 10 | 10 |
| Cane Molasses | 100 | 100 | 100 | 100 | 100 |
| Acid | phos | sulf | acet | hydr | prop |

The results in drying rates are set out in the following table:

TABLE 11

| | | | Time in Hours | | | |
|---|---|---|---|---|---|---|
| SN | Description | pH | 1.0 | 1.5 | 3.75 | 4.0 | 4.5 |
| 1 | Control | 5.2 | 55 | 65 | 75 | 80 | 82 |
| 2 | Control + 2% Lime | 10.0 | 63 | 73 | 85 | 84 | 90 |
| 3 | H$_3$PO$_4$ Neutral | 5.6 | 79 | 100 | — | — | — |
| 4 | H$_3$PO$_4$ Acidic | 4.4 | 89 | 100 | — | — | — |
| 5 | H$_2$SO$_4$ Neutral | 6.0 | 60 | 75 | 85 | 90 | 95 |
| 6 | H$_2$SO$_4$ Acidic | 4.2 | 74 | 84 | 90 | 95 | 100 |
| 7 | CH$_3$COOH Neutral | 7.6 | 58 | 79 | 90 | 95 | 100 |
| 8 | CH$_3$COOH Series | 4.8 | 65 | 80 | 90 | 95 | 100 |
| 9 | HCl Neutral | 7.6 | 55 | 70 | 80 | 85 | 90 |
| 10 | HCl Acidic | 4.2 | 68 | 84 | 95 | 95 | 100 |
| 11 | C$_2$H$_5$COOH Neutral | 6.0 | 65 | 80 | 90 | 95 | 100 |
| 12 | C$_2$H$_5$COOH Acidic | 4.9 | 62 | 71 | 90 | 95 | 100 |

From the preceding data, it is apparent that all samples prepared by the addition of any of the acids dried faster than the two controls. Phosphoric acid gave the greatest improvement in drying rate, and acetic and propionic acids gave lesser improvements in drying rates.

EXAMPLE 5

A series of experiments was run to determine the effectiveness of magnesium hydroxide, alone, and in combination with lime, on the drying rate of molasses. In the experiments, a series of samples were prepared for each formulation at varied pH values which were 10.0 (no acid added), 6-8 (neutral) and 4-5 (acidic).

The following formulations were prepared:

TABLE 12

| Item | #1 | #2 | #3 | #4 |
|---|---|---|---|---|
| 79.5 Brix Cane Molasses | 200 | 200 | 200 | 200 |
| 20% Quick Lime | 20 | — | — | — |
| 26% Hydrated Lime | — | 20 | — | — |
| 20% MgO | — | — | 20 | — |
| 50/50 Mix of MgO & CaO | — | — | — | 20 |
| Phos Acid - | | | | |
| 1 | 4 | 4 | 4 | 4 |
| 2 | 12 | 12 | 12 | 12 |
| pH | 10.0 | 10.0 | 9.5 | 10.0 |
| pH | 6.9 | 6.8 | 6.2 | 6.3 |
| pH | 4.6 | 4.4 | 4.6 | 4.5 |

Each samples was dried in a 190° F. forced air oven. Samples were removed periodically and weighed, and the percent moisture removed, as a percent of that initially present, was calculated.

The following drying rates were observed:

TABLE 13

| SN | pH | 0.75 Hr | 1.25 Hr | 2.75 Hr | 3.25 Hr | 4.00 Hr |
|---|---|---|---|---|---|---|
| 2% Quick Lime Samples |||||||
| 1 | 5.2 | 56 | 61 | 72 | 76 | 80 |
| 2 | 10.0 | 57 | 67 | 75 | 75 | 85 |
| 3 | 6.9 | 70 | 90 | 100 | 100 | — |
| 4 | 4.6 | 70 | 90 | 100 | — | — |
| 2.6% Hydrated Lime Samples |||||||
| 1 | 5.2 | 56 | 61 | 72 | 76 | 80 |
| 5 | 10.0 | 60 | 65 | 75 | 85 | 85 |
| 6 | 6.8 | 60 | 80 | 95 | 100 | — |
| 7 | 4.4 | 75 | 100 | 105 | 105 | — |
| 2% Magnesium Hydroxide Samples |||||||
| 1 | 5.2 | 56 | 61 | 72 | 76 | 80 |
| 8 | 9.5 | 55 | 70 | 80 | 80 | 80 |
| 9 | 6.2 | 37 | 70 | 85 | 80 | 80 |
| 10 | 4.6 | 50 | 60 | 85 | 85 | 90 |
| 2% Lime and Magnesium Hydroxide (1/1) Samples |||||||
| 1 | 5.2 | 56 | 61 | 72 | 76 | 80 |
| 11 | 10.0 | 57 | 67 | 85 | 85 | 87 |
| 12 | 6.3 | 46 | 59 | 78 | 83 | 90 |
| 13 | 4.5 | 71 | 81 | 100 | 100 | — |

The results indicate that the samples containing MgO exhibited drying rates which were only slightly greater than the control sample. The results also indicated that there was no apparent difference in drying rates between the samples prepared with quick Lime and those prepared with hydrated lime. Finally, the samples prepared with a mixture of MgO and CaO exhibited faster drying than the control but not as fast as the two series of samples prepared with lime.

In all series, the acidic pH samples dried faster than the neutral or basic pH samples.

EXAMPLE 6

An experiment was performed to determine if the process of the invention would be applicable to the drying of honey. In the experiment, two levels of quick lime (2% and 4%) and three pH values (alkaline, neutral and acid) were explored. The alkaline pH was that obtained by the addition of the quick lime, the neutral pH was from 6 to 8 and the acid pH was 3.5 to 4.5. The quick lime was prepared as a 20% solution of CaO. The honey had approximately 20% moisture. The following formulations were prepared:

TABLE 12

| Ingredient | #1 | #2 |
|---|---|---|
| 1) Honey | 200 gm | 200 gm |

TABLE 12-continued

| Ingredient | #1 | #2 |
|---|---|---|
| 2) 20% Quick Lime | 20 gm | 40 gm |
| 3) 1st Acid pH | 5.7 | 7.8 |
| 4) 2nd Acid pH | 4.5 | 4.0 |
| 5) Moisture | 25% | 29% |

The samples were subjected to the standard drying conditions and the drying rates which were observed are summarized in the following table:

TABLE 15

| No. | % Lime | pH | 1 Hr | 2 Hr | 3 Hr | 4 Hr | Color |
|---|---|---|---|---|---|---|---|
| control | 0 | 7.0 | 16 | 25 | 50 | 50 | yellow liquid |
| 2 | 2% | 10.0 | 31 | 50 | 60 | 75 | very dark brown |
| 3 | 2% | 5.7 | 29 | 36 | 50 | 65 | light brown |
| 4 | 2% | 4.5 | 30 | 38 | 56 | 63 | light brown |
| 5 | 4% | 10.0 | 47 | 58 | 88 | 94 | almost black |
| 6 | 4% | 7.8 | 50 | 50 | 72 | 83 | light brown |
| 7 | 4% | 4.0 | 39 | 67 | 83 | 89 | very light yellow |

The results indicate that honey can be readily dried to a solid product with the process of the invention, whereas under the same conditions, the untreated honey remains a concentrated liquid. Although the alkaline (pH 10) samples exhibited the highest drying rates the flavor and color of the sample was degraded. The acidic pH samples dried almost as rapidly as the alkaline pH samples, and had the best appearance and flavor, experiencing no discoloration or loss of flavor on drying.

EXAMPLE 7

The effectiveness of the invention for the drying of Karo (corn) syrup was studied in the following experiments. Dark and white Karo syrup was used in the experiments, and lime was combined with phosphoric acid and with sulfuric acid in the treatment of the dark syrup. The samples were prepared in the same manner as previously described to obtain samples of untreated (control) and treated dark syrup at alkaline, neutral and acidic pH values. An acidic sample of the white syrup was prepared. The samples were subjected to the standard drying conditions and the results in drying rates which were observed are summarized in the following tables:

TABLE 16

(dark syrup)

| No | Lime Level | Acid | pH | 1 Hr | 3 Hr | 4 Hr |
|---|---|---|---|---|---|---|
| control | 0 | — | 7.0 | 64 | 73 | 73 |
| 2 | 2% | phos | 10.0 | 57 | 79 | 79 |
| 3 | 2% | phos | 6.0 | 58 | 75 | 75 |
| 4 | 2% | phos | 4.5 | 50 | 75 | 78 |
| 9 | 2% | sulf | 7.5 | 54 | 76 | 85 |
| 10 | 2% | sulf | 3.6 | 67 | 82 | 86 |
| 5 | 4% | phos | 10.0 | 76 | 94 | 94 |
| 6 | 4% | phos | 9.0 | 65 | 88 | 94 |
| 7 | 4% | phos | 7.0 | 69 | 89 | 89 |
| 8 | 4% | phos | 4.6 | 75 | 94 | 94 |

TABLE 17

(white syrup)

| No | Lime Level | pH | Sample Size | % Water | 1 Hr | 2 Hr | 3 Hr |
|---|---|---|---|---|---|---|---|
| 7 | 2% | 4.1 | 6.4 | 30% | 47 | 100 | 100 |
| 10 | 3% | 4.0 | 6.3 | 33% | 62 | 86 | 92 |

The results indicate that the treatment of the invention enhances the drying rates of corn syrup and that the best results were obtained with the highest concentration of lime and acid.

The invention was also applied to the treatment of other sugar solutions including whole whey, inverted whey and inverted, de-lactosed whey, whey condensed solubles, and sodium lignon sulfonate. In all applications, these ligands all exhibited an enhanced drying rate when treated with lime and phosphoric acid in accordance with the invention.

EXAMPLE 8

A soft, moist dog food precursor is prepared in a laboratory mixer of 2 liter capacity equipped with a turbine mixer. The pet food is prepared using the procedure described in my prior patent; U.S. Pat. No. 4,643,908 and a varied proportion of water, propylene glycol and bran in a series of experiments. The resultant soft, moist products are then dried in an oven maintained at 125° F. to obtain dry solids.

The following formulations are prepared:

TABLE 8

| Ingredient | A | B | C |
|---|---|---|---|
| Water | 320 ml | 240 ml | 240 ml |
| Glycol | 0 | 80 gm | 0 |
| Bran | 0 | 0 | 80 gm |
| Lime* (hydrated) 25% | 80 gm | 80 gm | 80 gm |
| Chicken Meal | 250 gm | 250 gm | 250 gm |
| Dried Whey** | 250 gm | 250 gm | 250 gm |
| Potassium Sorbate | 2 gm | 2 gm | 2 gm |
| Phosphoric Acid (75%) | 40 gm | 40 gm | 40 gm |
| Total | 942 gm | 942 gm | 942 gm |

*The lime is hydrated in three volumes of water prior to addition to the ingredients.
**Inverted whey to avoid lactose intolerance of adult dogs.

After the last ingredient is added, each mixture is stirred and its pH is determined, and adjusted to 6.0. The viscosity of each mixture is determined and 200 gram samples of each are poured into plastic film bags which are placed in 250 milliliter beakers.

After the samples have gelled into soft and moist solids, they are removed and sliced to obtain samples approximately ¼ inch in thickness. The sliced samples are weighed and placed on a tray and the tray is placed in a 125° F. oven. The following morning the tray is removed and the solids are inspected and weighed. All the samples appear to be dry, hard solids. The samples are stored under low humidity conditions (35% relative humidity) for a week and reweighed. They are then stored in a humidity chamber at 100% relative humidity for 2 days and again reweighed.

The following table summarizes the moisture contents of the samples and weight gains or losses of the samples when stored under varied humidity conditions:

TABLE 9

| Sample No. | Moisture Content | Weight Change On Storage | |
|---|---|---|---|
| | | 1 Week at 35% RH | 2 Days at 100% RH |
| 1 | 7.8 | −1.2% (loss) | 0.2% |
| 2 | 10.4 | −1.6% (loss) | 0.4% |
| 3 | 11.6 | −0.4% (loss) | −1.0% (loss) |

The solids which are produced are substantially non-hygroscopic, a surprising result in view of their high sugar contents.

The pet food solids are fed to dogs in feeding trials and it is observed that the samples are preferred by a large margin over representative samples of dry and semi-moist dog foods currently being marketed. The representative samples are all cereal based products in which solidification is achieved by gelation of starch from the cereal ingredients. Since the pet food produced by the method of this invention can be produced entirely from milk and meat by-products, the pet food solids have a superior amino acid profile than dog foods which are based on cereal products.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A method for the preparation of a dry and non-hygroscopic solid food which comprises:
    a) the step of mixing an aqueous food solution containing at least 40 weight percent solids comprising sugar, protein or mixtures thereof with:
        (i) an alkaline additive selected from the group consisting of calcium and magnesium oxides and hydroxides in an amount from 0.05 to about 3.0 weight percent calculated as the oxide; and
        (ii) an acid selected from the group consisting of phosphoric, sulfuric, hydrochloric and acetic acids in an amount from 0.03 to about 2.0 weight percent to prepare a mixture; and
    b) the step of evaporating water from said mixture to reduce its water content to less than twelve weight percent and form said non-hygroscopic solid.

2. The method of claim 1 wherein said evaporating step is sufficient to reduce the water content of said mixture to less than eight weight percent.

3. The method of claim 1 wherein said evaporating step is sufficient to reduce the water content of said mixture to less than five weight percent.

4. The method of claim 1 wherein said evaporating of water is performed by containing said mixture with dry air while maintaining the temperature of said mixture at 100° F. to 300° F.

5. The method of claim 4 wherein said temperature is maintained at 125° F. to 250° F.

6. The method of claim 4 wherein said temperature is maintained by preheating said dry air to a temperature from about 275° F. to about 350° F. prior to contacting said mixture.

7. The method of claim 1 wherein said mixture is passed as a liquid into said evaporating water step.

8. The method of claim 1 wherein said mixture is stored and permitted to solidify into a solid gel and the solid gel is introduced into said evaporating water step.

9. The method of claim 1 wherein a filler selected from the group consisting of protein meals, and brans, hulls, shells and screenings of grains, seeds and nuts is incorporated into said mixture in an amount sufficient to provide from 5 to about 50 weight percent of said non-hygroscopic solid.

10. The method of claim 9 wherein said filler is incorporated in said mixture in an amount from 10 to 35 weight percent of said non-hygroscopic solid.

11. The method of claim 10 wherein said filler is a protein meal.

12. The method of claim 11 wherein said protein meal is meat meal.

13. The method of claim 12 wherein said aqueous feed solution is whey.

14. The method of claim 12 wherein said aqueous feed solution is inverted whey.

15. The method of claim 13 wherein said protein meal and inverted whey are used in approximately equal weight proportions.

16. The method of claim 13 wherein said mixture is formed into flat planar shapes.

17. The method of claim 14 wherein said mixture is permitted to solidify and the resultant solid is introduced into said drying step.

18. The method of preparing a solid pet food which comprises:
    a) the step of mixing an aqueous solution of inverted whey containing at least 45 weight percent solids with a protein meal in weight proportions of 0.5 to 2.0 weight parts inverted whey per weight part of protein meal, and with gelling agents consisting essentially of
        (i) calcium oxide or hydroxide in an amount from 0.1 to 5.0 weight percent, calculated as the oxide; and
        (ii) a soluble phosphate in an amount from 0.1 to 5.0 weight percent expressed as $P_2O_5$ to prepare a mixture which contains sufficient amounts of said gelling agents to cause gelation of said mixture; and
    b) the step of evaporating water from said mixture to reduce its water content to less than 12 weight percent.

19. The method of claim 18 wherein said evaporating of water is performed by heating said mixture to a temperature from 100° F. to 300° F.

20. The method of claim 19 wherein said mixture is permitted to gel into flat planar shaped prior to said water evaporating step.

21. In the method for solidifying an aqueous food solution containing at least 40 weight percent solids comprising sugar, protein or mixtures thereof wherein agents consisting of calcium oxide or hydroxide and a soluble phosphate are added to the solution in amounts sufficient to form a solid gel containing at least 25 percent water, the improvement which comprises:
    evaporating water from said solid gel to reduce its water content to less than 12 weight percent and sufficiently low to obtain a non-hygroscopic solid.

22. In a method wherein an aqueous food solution containing at least 40 weight percent solids comprising sugar, protein, or mixtures thereof is dried by evaporation of water therefrom to obtain a solid containing less than 12 weight percent water, the improvement which comprises: adding to said solution an alkaline material selected from the group consisting of calcium and magnesium oxides and hydroxides in an amount from 0.05 to about 3.0 weight, percent, calculated as the oxide, and an acid selected from the group consisting of phosphoric, sulfuric, hydrochloric and acetic acids in an amount from 0.03 to about 2.0 weight percent to prepare a mixture, and evaporating water from said mixture to reduce its water content to less than about 8 weight percent, sufficient to form a dry solid.

23. The method of claim 22 wherein said evaporating of water is performed by containing said mixture with dry air while maintaining the temperature of said mixture at 100° F. to 300° F.

24. The method of claim 23 wherein said temperature is maintained at 125° F. to 250° F.

25. The method of claim 23 wherein said temperature is maintained by preheating said dry air to a temperature from about 275° F. to about 350° F. prior to contacting said mixture.

26. The method of claim 22 wherein said mixture is passed as a liquid into said evaporating water step.

27. The method of claim 22 wherein said solution is molasses.

28. The method of claim 22 wherein said solution is corn steep liquor.

* * * * *